United States Patent [19]

Froelich

[11] Patent Number: 4,647,981
[45] Date of Patent: Mar. 3, 1987

[54] AUTOMATIC WHITE LEVEL CONTROL FOR A RIS

[75] Inventor: Ronald Froelich, Covina, Calif.

[73] Assignee: Xerox Corporation, Stamford, Conn.

[21] Appl. No.: 664,735

[22] Filed: Oct. 25, 1984

[51] Int. Cl.$^4$ .............................................. H04N 1/040
[52] U.S. Cl. .................................. 358/285; 358/280; 250/578
[58] Field of Search ............... 358/285, 174, 206, 207, 358/280; 250/578

[56] References Cited

U.S. PATENT DOCUMENTS

| 4,287,536 | 9/1981 | Wiggins | 358/282 |
|---|---|---|---|
| 4,314,281 | 2/1982 | Wiggins et al. | 358/280 |
| 4,329,717 | 5/1982 | Logie et al. | 358/282 |
| 4,338,020 | 7/1982 | Yukawa et al. | 355/75 |
| 4,383,275 | 5/1983 | Sasaki et al. | 358/280 |

OTHER PUBLICATIONS

L. W. Bassetti et al, "Illumination Regulation for Array Scanner", IBM Tech. Discl., vol. 22, No. 8A, Jan. 1980, p. 3131.
K. A. Bushw, "Automatic Calibration of Scanner Compensation Apparatus", IBM Tech. Discl. Bulletin vol. 24, No. 3, Aug. 1981, pp. 1652-1654.
G. M. Mechalek, "A Novel Automatic Gain Control Method for Image Input Terminals", IBM Tech. Discl. Bul., vol. 7, No. 1, 1-2/82, p. 53.

Primary Examiner—Edward L. Coles, Sr.
Attorney, Agent, or Firm—Robert E. Cunha

[57] ABSTRACT

A circuit for correcting a raster input scanner or raster output scanner is described. During calibration, a calibration strip is scanned, the output of the light detector is compared to a reference voltage, and the difference is saved. This is a closed loop so that the difference value will settle at a value such that the detector output will accurately match the reference value before the final difference value is stored. In one mode, the correction is applied to one dynode of the PMT light detector, which varies the gain without varying the bandwidth of the circuit. The difference voltage is analog, but is stored in a digital memory through the use of A to D and D to A converters.

8 Claims, 22 Drawing Figures

ROS

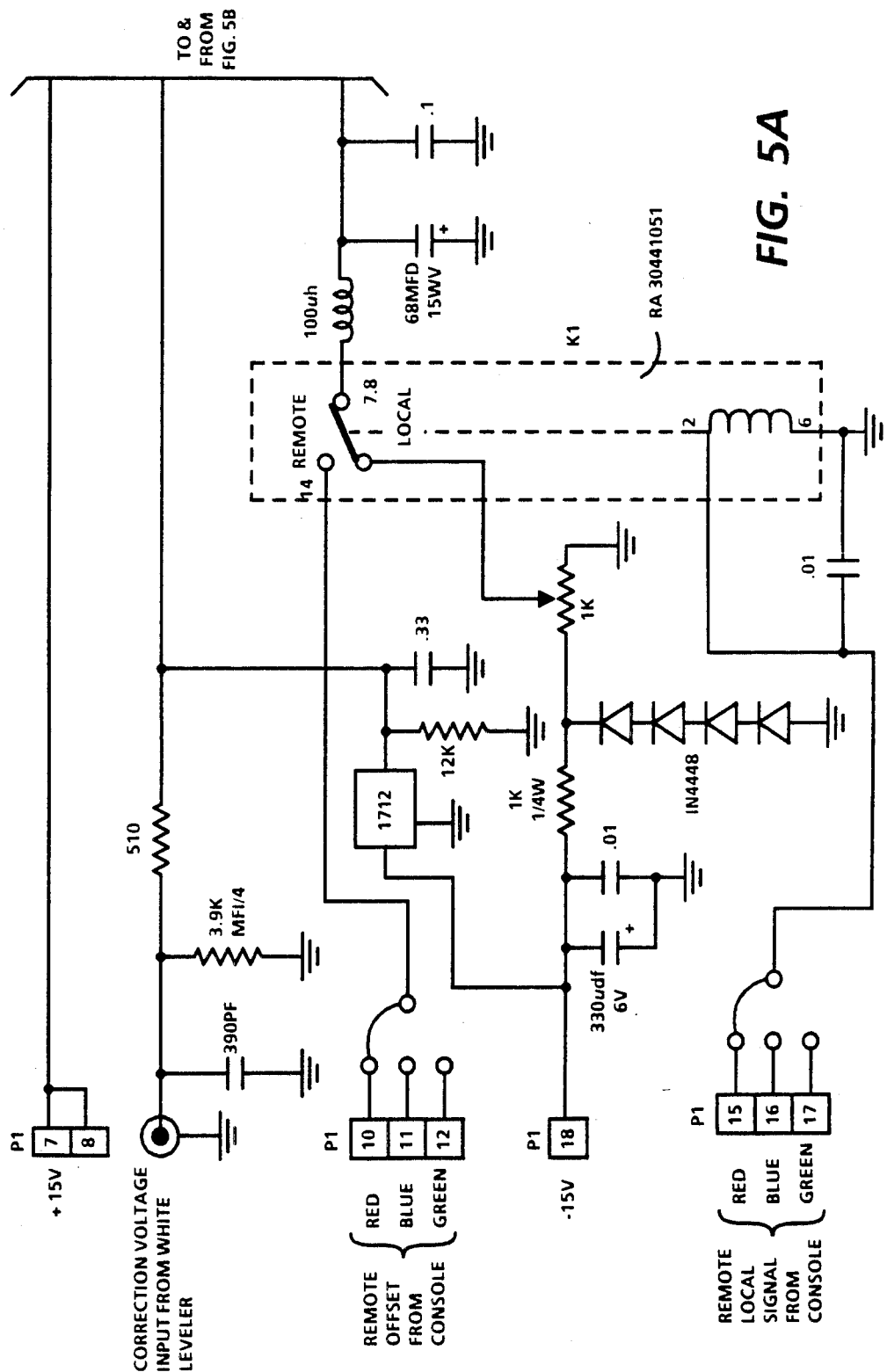

AUTOMATIC WHITE LEVEL CONTROL FOR A RIS

BACKGROUND OF THE INVENTION

This invention is a circuit for maintaining at a constant level the photomultiplier output in a raster input scanner (RIS) or the light level of the scanning beam in a raster out scanner (ROS), and more specifically is a circuit for determining the amount of deviation of the light level from the desired level during a calibrate phase, and using that correction value during the actual reading or writing phase of operation for normalizing the output.

In a raster input scanner of the type having a rotating polygon, a beam of light illuminates one polygon facet at a time to produce a flying spot. This in turn illuminates one line of the original, and the reflected light is received by a photomultiplier to form one line of video in the form of an analog voltage.

A problem in polygon systems is that the light intensity varies across the line as a function of spot speed which may be slower at the center of the line, as a function of energy distribution along the line due to changing optical parameters (such as efficiency), and as a function of the angle between the original and the beam, which is off normal at the ends of the line. These and other factors affect the light intensity, the corrections for which may add cost or other complications to the system.

One prior correction system uses a preliminary calibrate procedure comprising the scanning of a test strip. The amount of light is measured by the photo multiplier tube (PMT), the analog output voltage of which is compared to a threshold. A correction voltage is determined from this comparison, and is stored. Later, during the regular operation of the system, this correction voltage is added back into the PMT output to maintain at the output of the circuit a constant voltage for a constant level of original brightness. However, there are problems with this system. Correcting the gain of the amplifier circuit changes the bandwidth of the system, and there is no assurance that the correction is accurate. These problems become more important in a color system where variations of bandwidth and light levels may distort the colors.

Raster output scanners are similar. An intensity modulated flying spot illuminates a xerographic drum, or the like, and variations in the basic intensity of the light at the drum may create color distortions.

What is required is a system for correction of light variations that will not change the bandwidth of the amplifier circuits, and one that will make accurate corrections.

SUMMARY OF THE INVENTION

This invention accomplishes these objectives by generating a correction voltage during a calibrate phase which is used with a feedback circuit to create an accurate correction, and which is used to vary either the light level, or the amplification of the PMT, to make the bandwidth of the system independent of the correction.

In a raster input scanner, during the calibrate phase, a test strip of a known reflectivity, typically white or gray, is scanned by the spot, and the output of the PMT is compared to a predetermined threshold. The difference is an analog voltage by which the output of the PMT must be corrected. The most common method of storing information is to store it digitally. In this case the output of the comparator is converted to digital form and stored in RAM; then reconverted to analog for use as an input to one dynode of the PMT.

A PMT typically has a number of dynodes, each amplifying the signal through secondary emission principles. The gain of each stage is a function of the voltage difference between that node and the previous node. Therefore, the amplification of the PMT is adjustable by varying either the total voltage applied to all or the single voltage applied to one dynode. Attempting to create a dynamic gain change in the PMT by varying the total applied PMT voltage, instead of the applied voltage to a single dynode, requires a complex dynode biasing scheme. However, as only a small gain change is required, changing the voltage of one dynode is quite sufficient. A benefit of biasing only one dynode is that the bandwidth of the PMT does not change as a function of the PMT gain.

It may be that a correction, measured once, may not be accurate. This system assures the accuracy of the correction voltage by closing the loop around the threshold detector during calibration. The corrected PMT output is continuously coupled to the comparator and to the remainder of the circuit so that the final value settles to one that exactly produces the required PMT amount.

Since the light level varies continuously over the scan, a number of corrections must be made. In this described embodiment, the scan is divided into two thousand segments or sections, and each section has its own eight bit correction factor.

After calibration, this system is used normally to scan the original image, and at each section of the line, the previously calculated correction voltage is applied to the PMT dynode. Therefore, the PMT output will be correctly calibrated for each section of the scan line, and any variation in PMT output will be completely the result of input image density.

A similar circuit can be used to calibrate a raster output scanner. Here the light beam exposes a xerographic drum. A PMT can be used to collect light reflected from a calibration strip on the drum. Here also, the PMT output is compared to a threshold. The difference is converted to a digital value and stored, and a reconverted analog voltage is output. However, this time instead of controlling a PMT dynode, the voltage is used to control the original light beam intensity. This can be done, for example, where the original light source is a light emitting diode. Then, the amount of emitted light is electrically controllable. Here again, the loop is closed so that the final value stored in memory will be appropriate to produce an accurate light value.

The result of this circuit is that in either a RIS or ROS, the operation of the system compensates for light variations.

The basic difference between this invention and the prior art is that the prior art adds a correction based on a predetermined correction curve without any post-correction testing to assure that the desired result actually is accomplished, the desired result being a normalized effective optical light level. In other words, the loop is not closed. In fact, a closed loop around the process greatly improves accuracy without the necessity of pre-determining a correction curve. Of course, pre-determined correction curves are of limited use since system components and function may vary over time.

Examples of system component changes are, a different pointing angle from the light source, an optical element readjusted, different performance in the light pickup device, and a shift in the location of the light emitting surface of the lasing diode. Another point of novelty is that the gain of the actual detector or pickup device can be changed from inside the loop in real time. That is, the illumination level can be changed in real time for the needed illumination correction by scanning the calibration strips between runs, or between copies.

DETAILED DESCRIPTION OF THE DRAWINGS

FIGS. 4A-H, J-N, P-S are detailed schematic diagrams of the circuit.

Figure 5B:
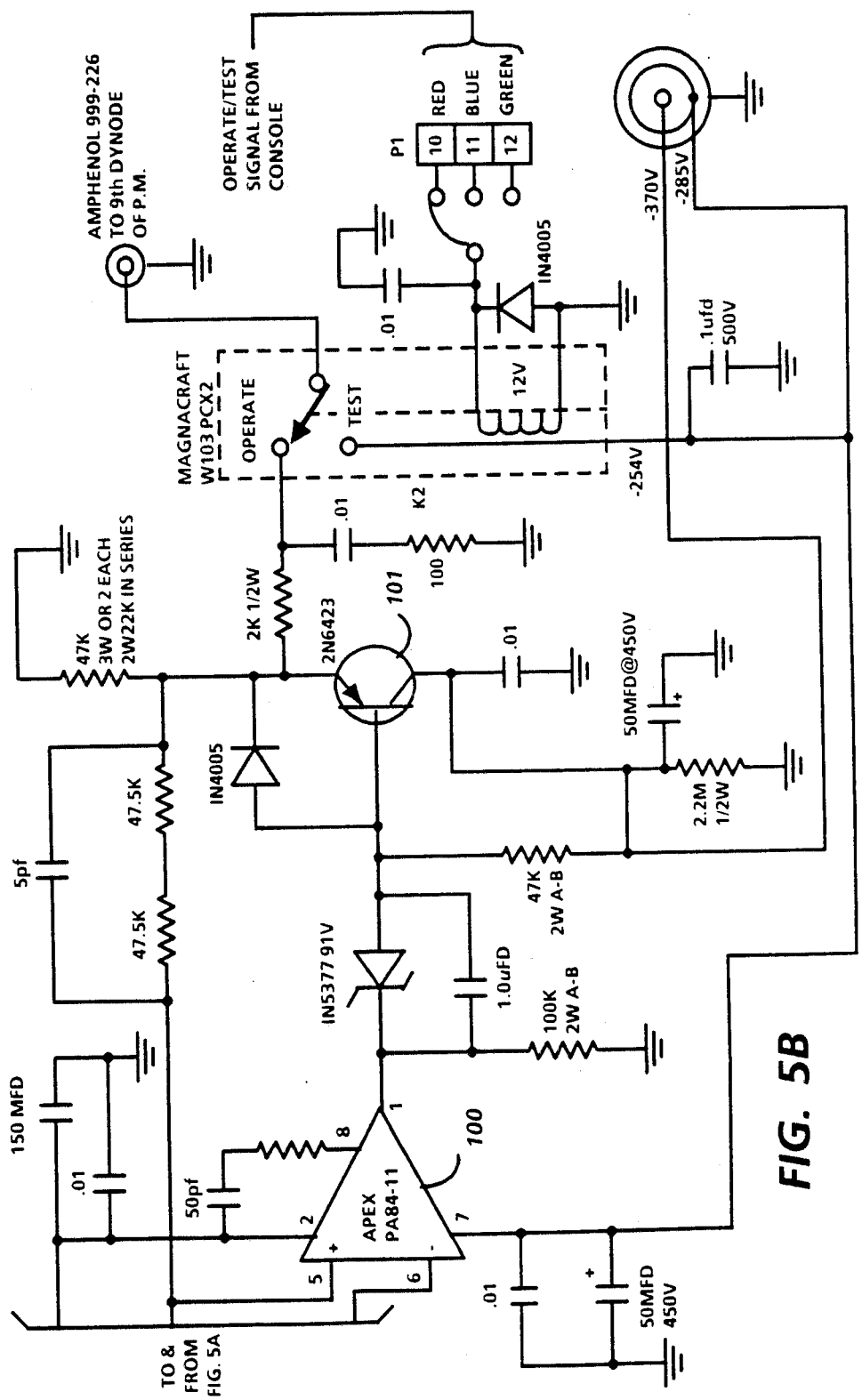

FIGS. 5A-B are detailed schematic diagrams of an amplifier.

DETAILED DESCRIPTION OF THE INVENTION

Figure 1:
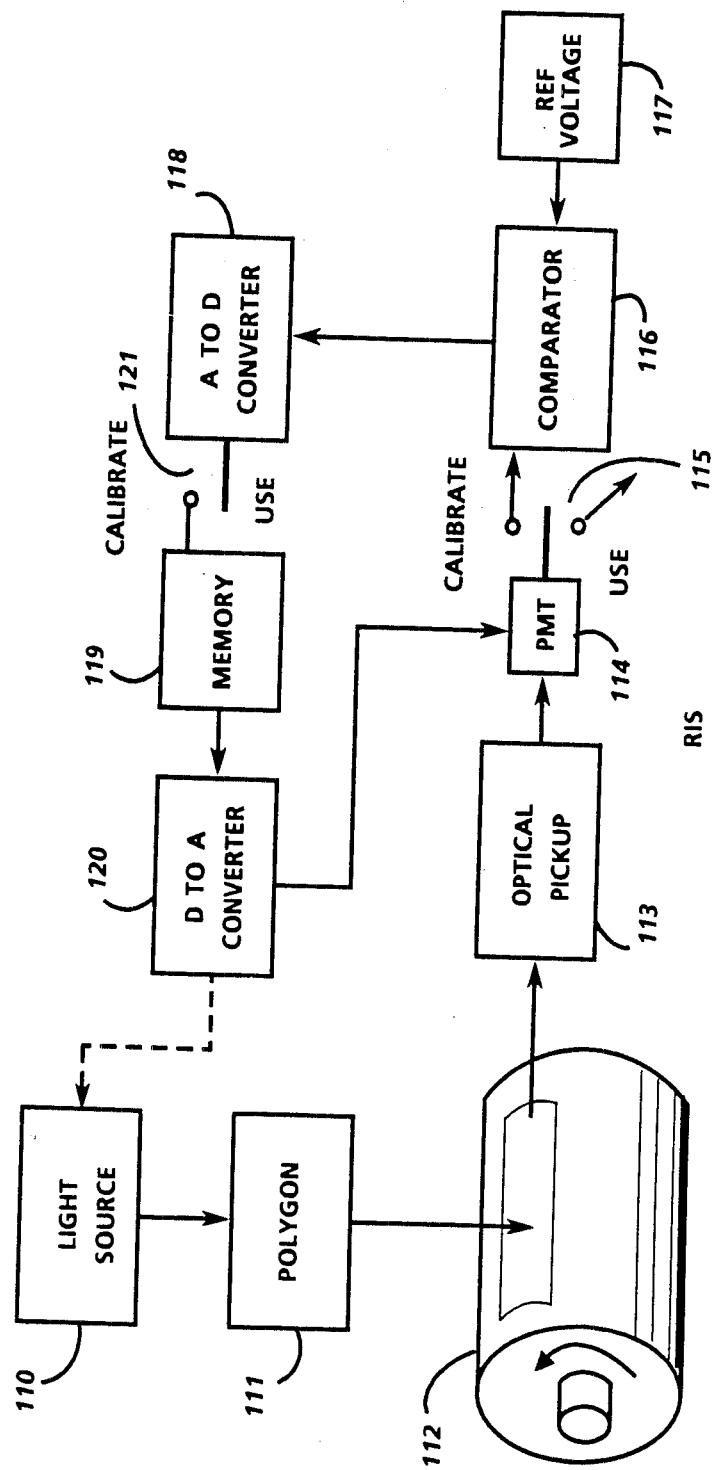
FIG. 1 is a block diagram of this invention in a raster input scanner.

FIG. 1 is a simplified block diagram of the raster input scanner circuit. In the calibrate mode, light from a light source 10 in the form of a collimated beam is reflected from the current facet of the polygon 11 onto a rotating drum. In this calibrate mode, the light is reflected from a calibration strip 112 of known color which is mounted on the drum or platen just above the original. The optical pickup system 113 collects the reflected light into the PMT 114, the output of which is coupled through the "calibrate" position of switch 115 to a comparator 116. The other input to the comparator 116 is the voltage 117 that the PMT should be producing from light received from the reference strip. Here the difference between the reference voltage 117 and the PMT output is produced, the difference being the amount of error in the system. This analog voltage is converted in A to D converter 118 and stored in memory 119 when switch 121 is in the calibrate position. This value is then converted back at D to A converter 120 to be used to control the gain of PMT 114 by controlling the voltage at one dynode. In the alternative, the PMT output could be controlled by varying the original amount of light from the light source, as shown by the dotted line.

Since this is a closed loop system, during each scan the various values in the system may take time to settle at the point where the PMT 114 output exactly equals the reference voltage 117.

At the end of the calibrate sequence, the memory contains one value for each segment of the scan line. Typically 2000 scan line segments and 12 to 16 lines of data might be stored. To obtain an arithmetic average of the lines stored an average is taken of the stored values for every segment from the 12 to 16 line samples. When the RIS starts to scan the actual image, switches 115 and 121 to to their "use" positions. In this case, the memory 119 is no longer updated, and supplies its output through converter 120 to the PMT 114, the output of which is fully corrected and useable directly by the remainder of the system.

Figure 2:
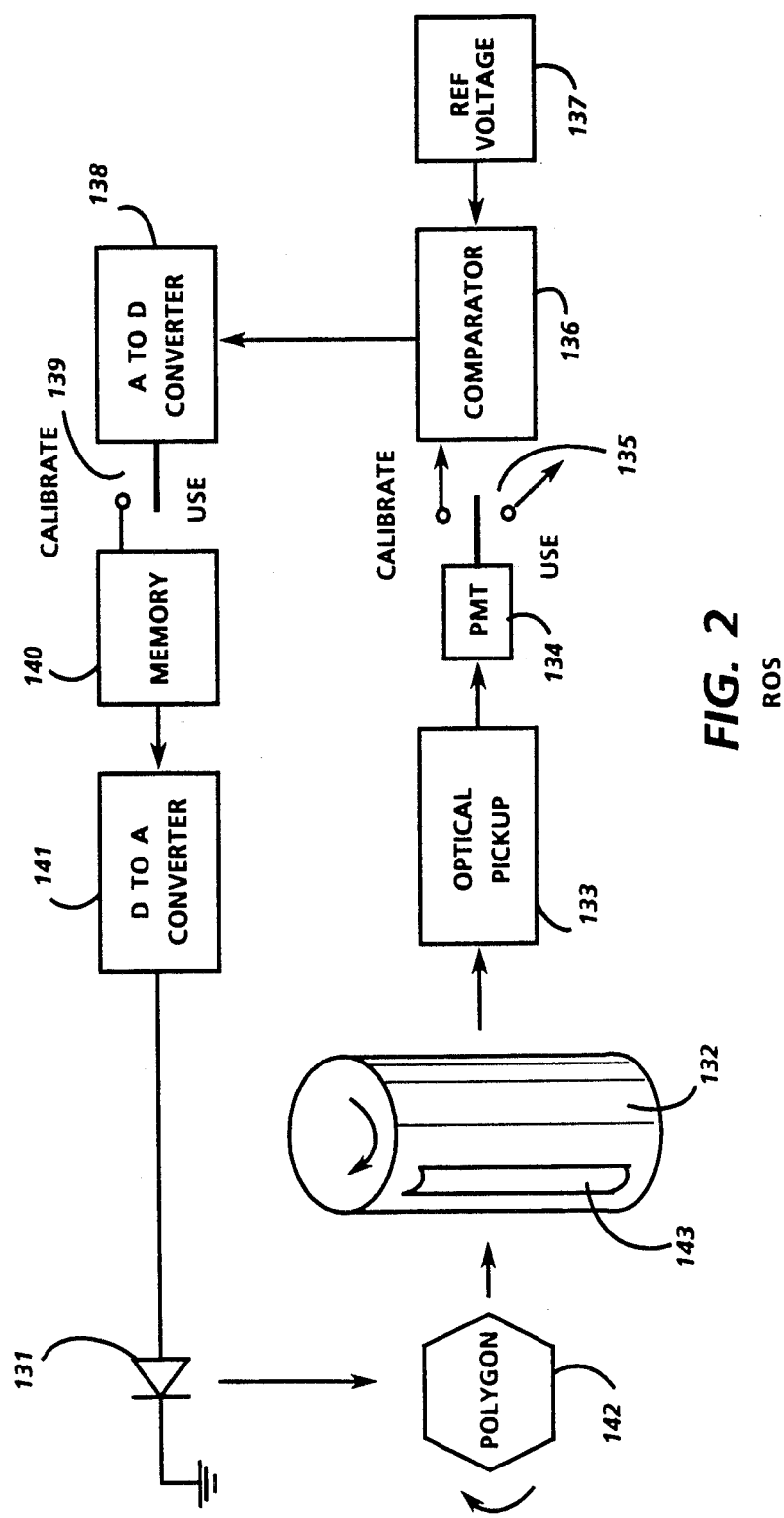
FIG. 2 is a block diagram of this invention in a raster output scanner.

FIG. 2 is a simplified diagram of the ROS version. Light emitting diode 131 illuminates the current facet of polygon 142 which produces a flying spot to expose one line on selenium drum 132. For calibration, an optical pickup system 133 collects the light reflected from the calibration strip 143 and couples it to the input of PMT 134. In the "calibrate" mode, switch 135 is closed, allowing the comparator 136 to determine the diffrence between the PMT 134 output and the predetermined reference voltage 137. The output is converted in A to D converter 138 and, when switch 139 is in the "calibrate" position, stored in memory 140. The memory 140 output is converted in D to A converter 141 into a voltage which can be used to control the amount of light emitted from LED 131. Since this is a closed loop system, the circuit voltage will finally settle at a point where the PMT 134 voltage equals the reference voltage 137.

In the "use" mode, the memory 140 supplies a correction voltage through converter 141 to the light source 131 which illuminates the drum 132. The remainder of the circuit elements from the optical pickup 133 to the A to D converter 138 are not used.

Figure 3:
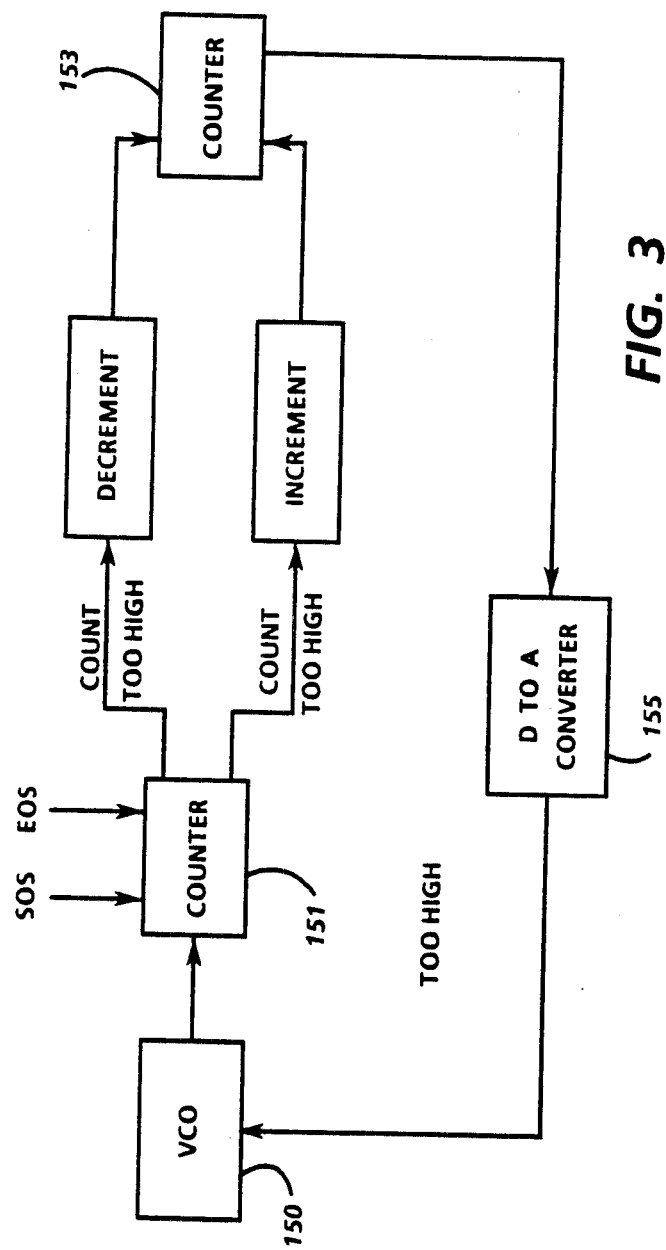
FIG. 3 is a block diagram of a clock generator.
Figure 4A:
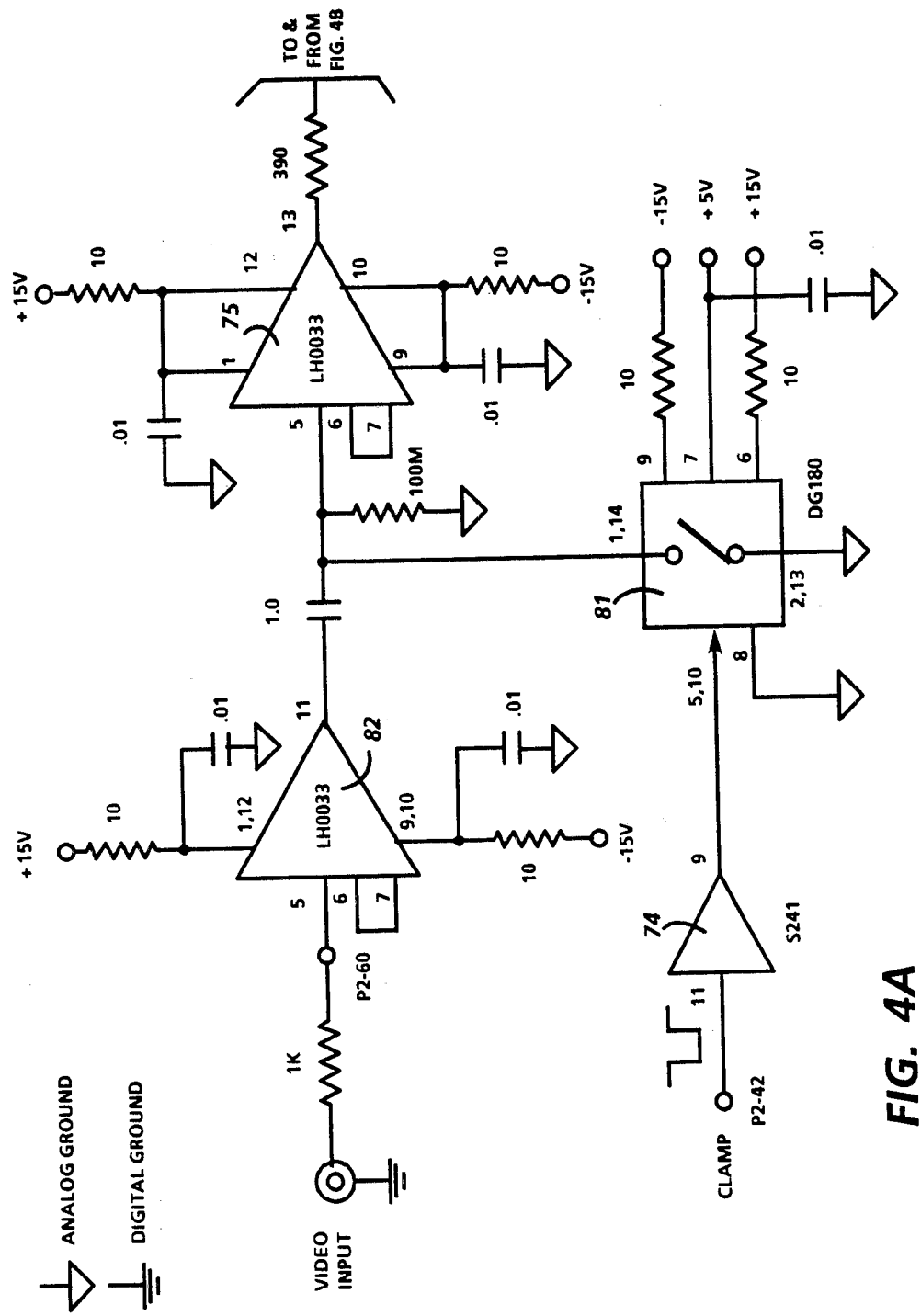
Figure 4B:
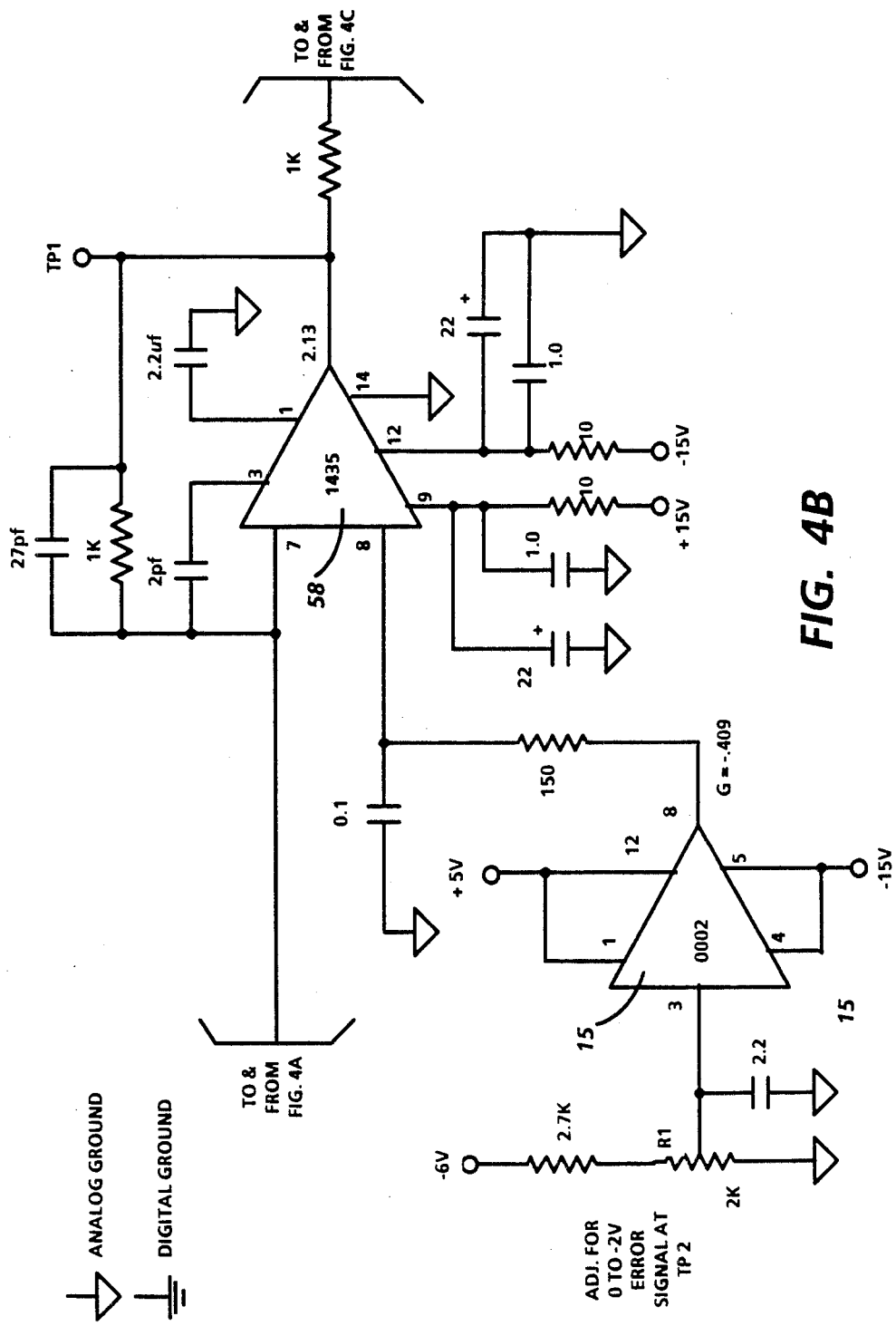
Figure 4C:
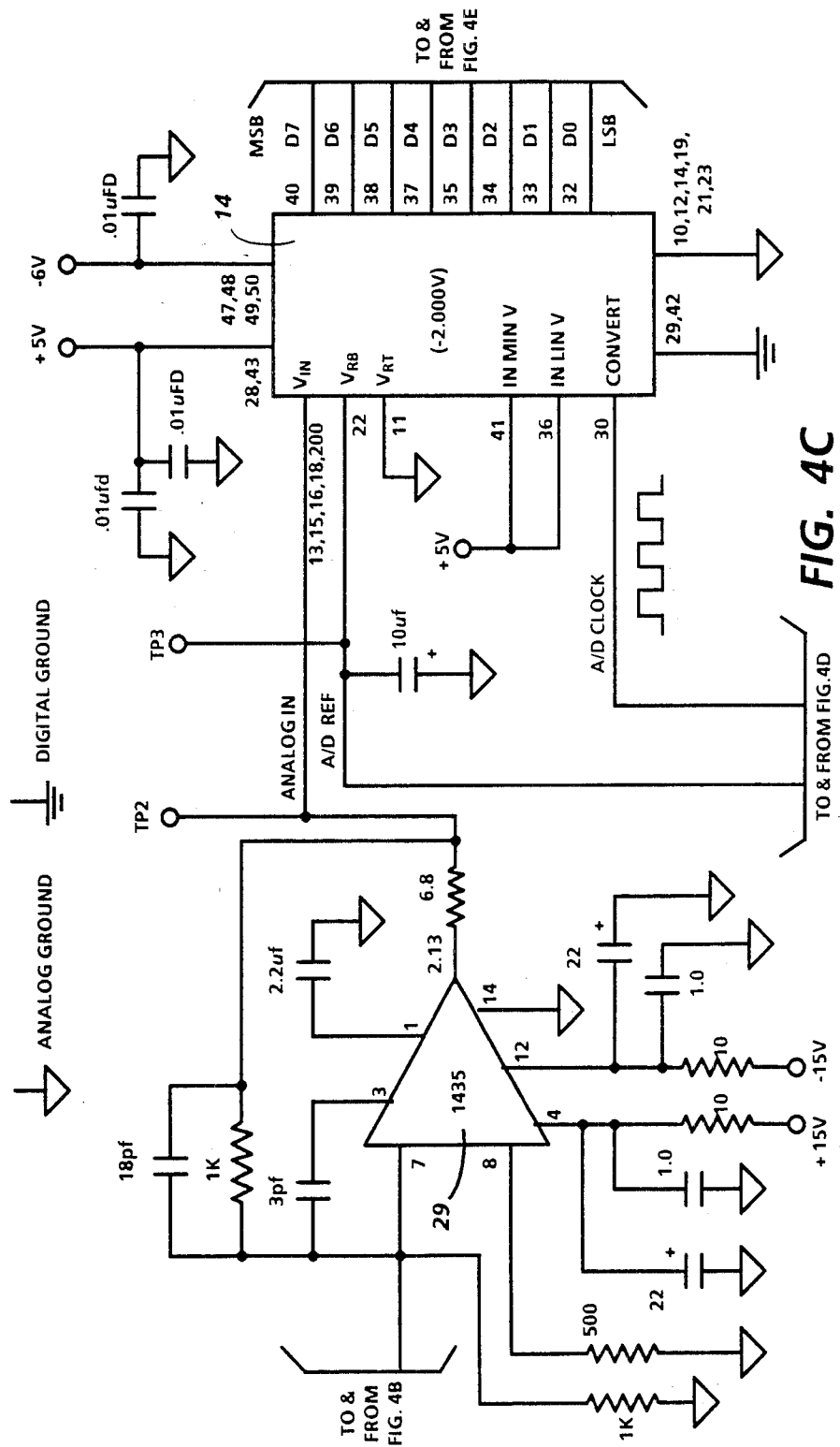
Figure 4D:
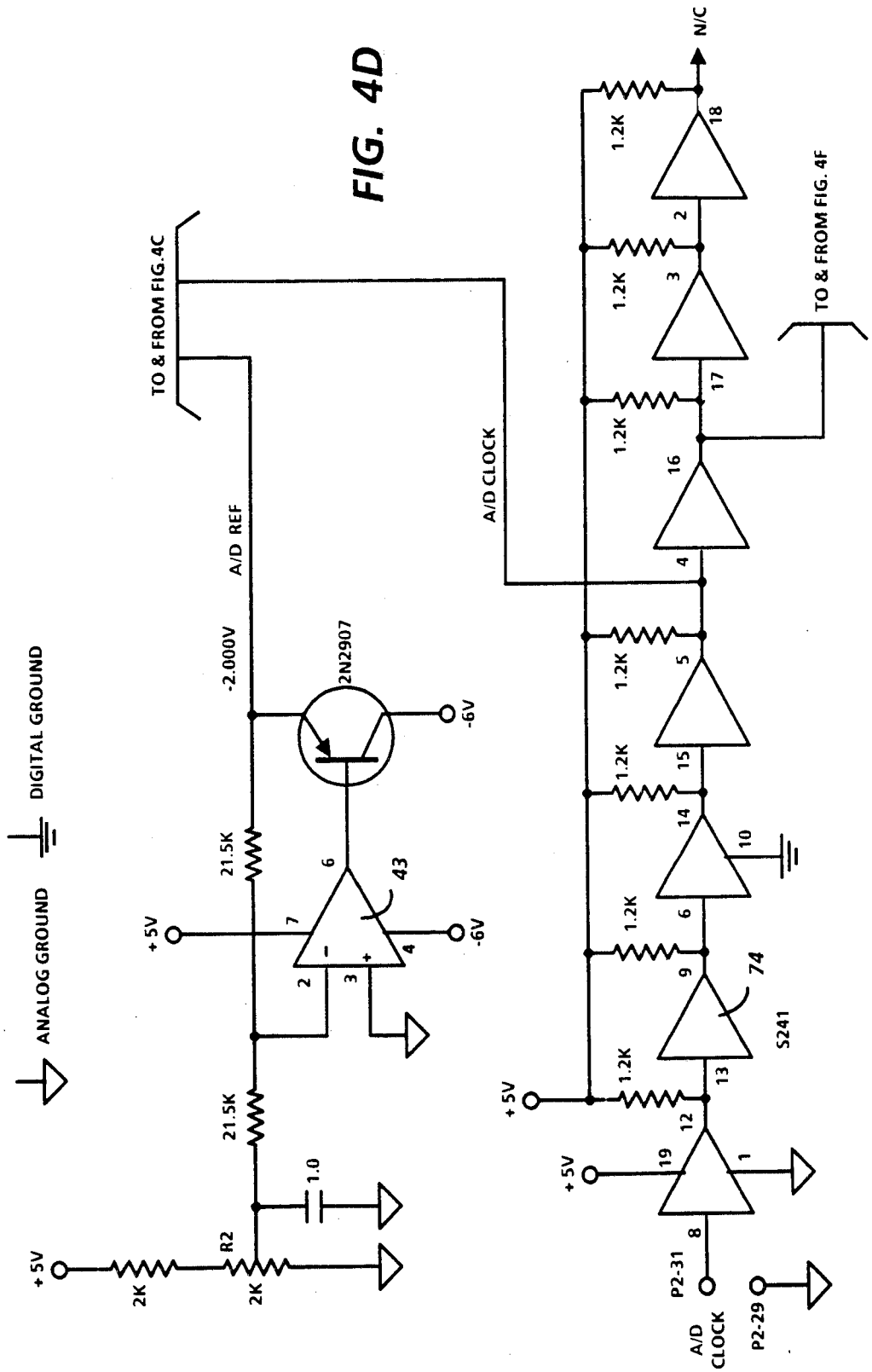
Figure 4E:
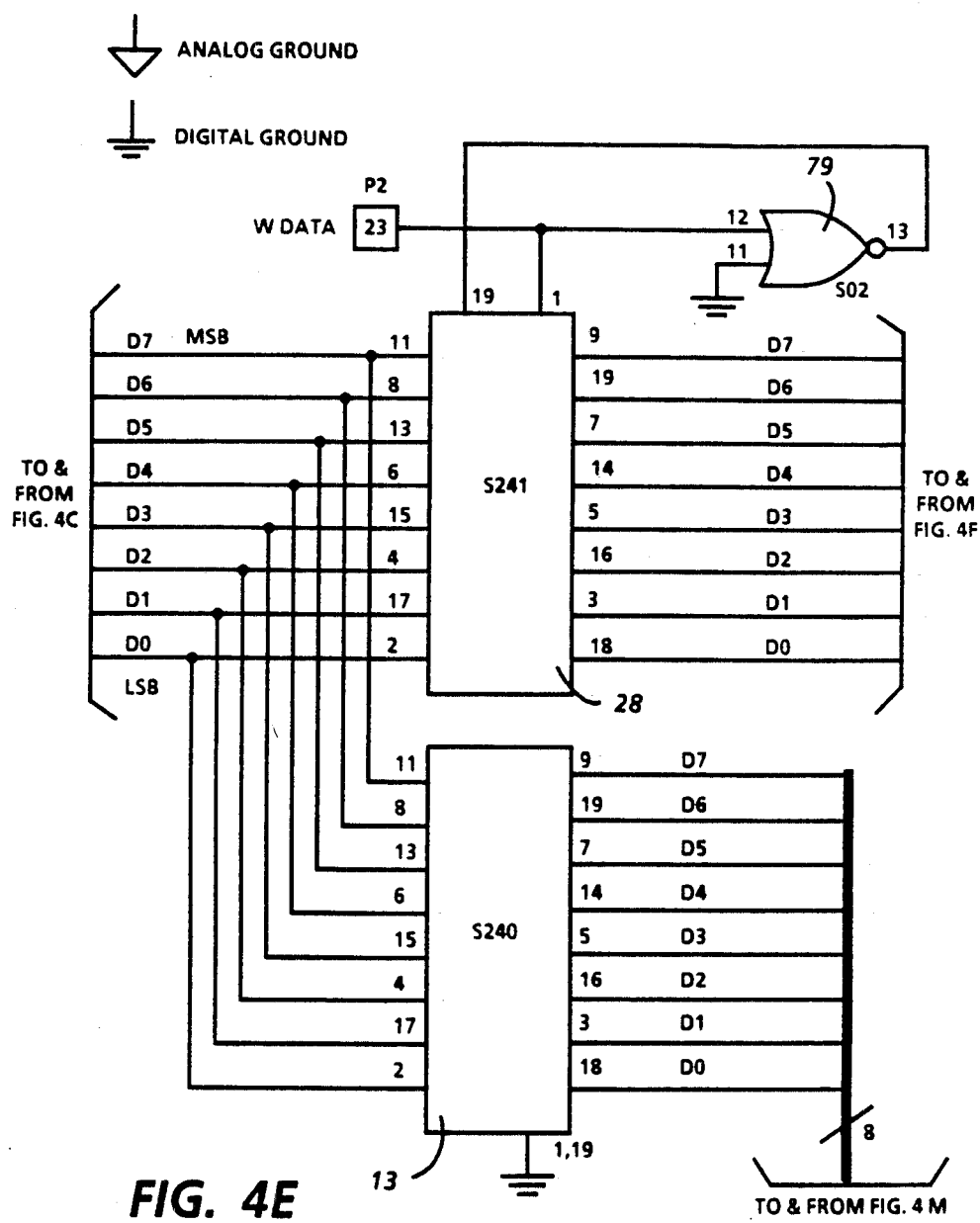
Figure 4F:
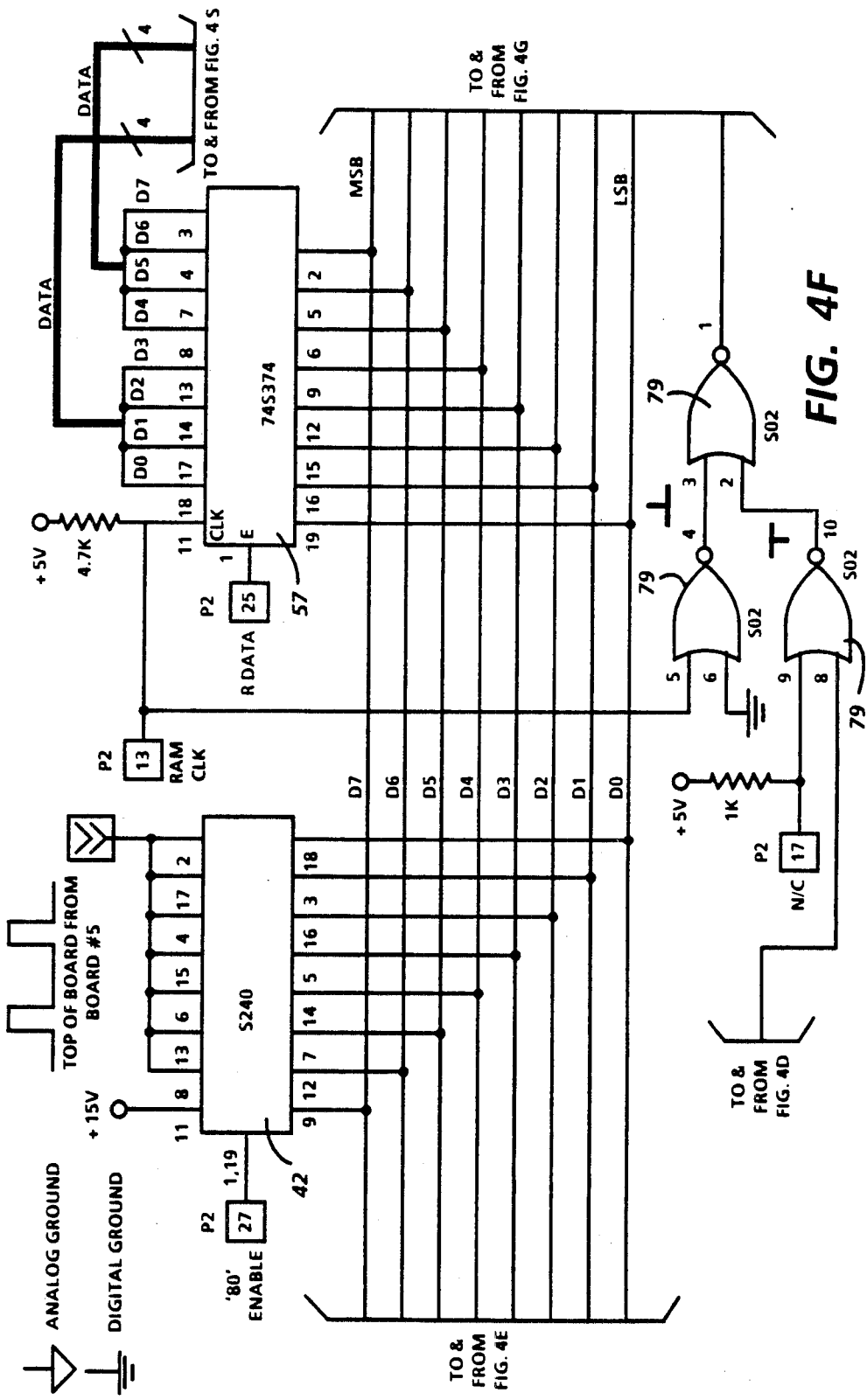
Figure 4G:
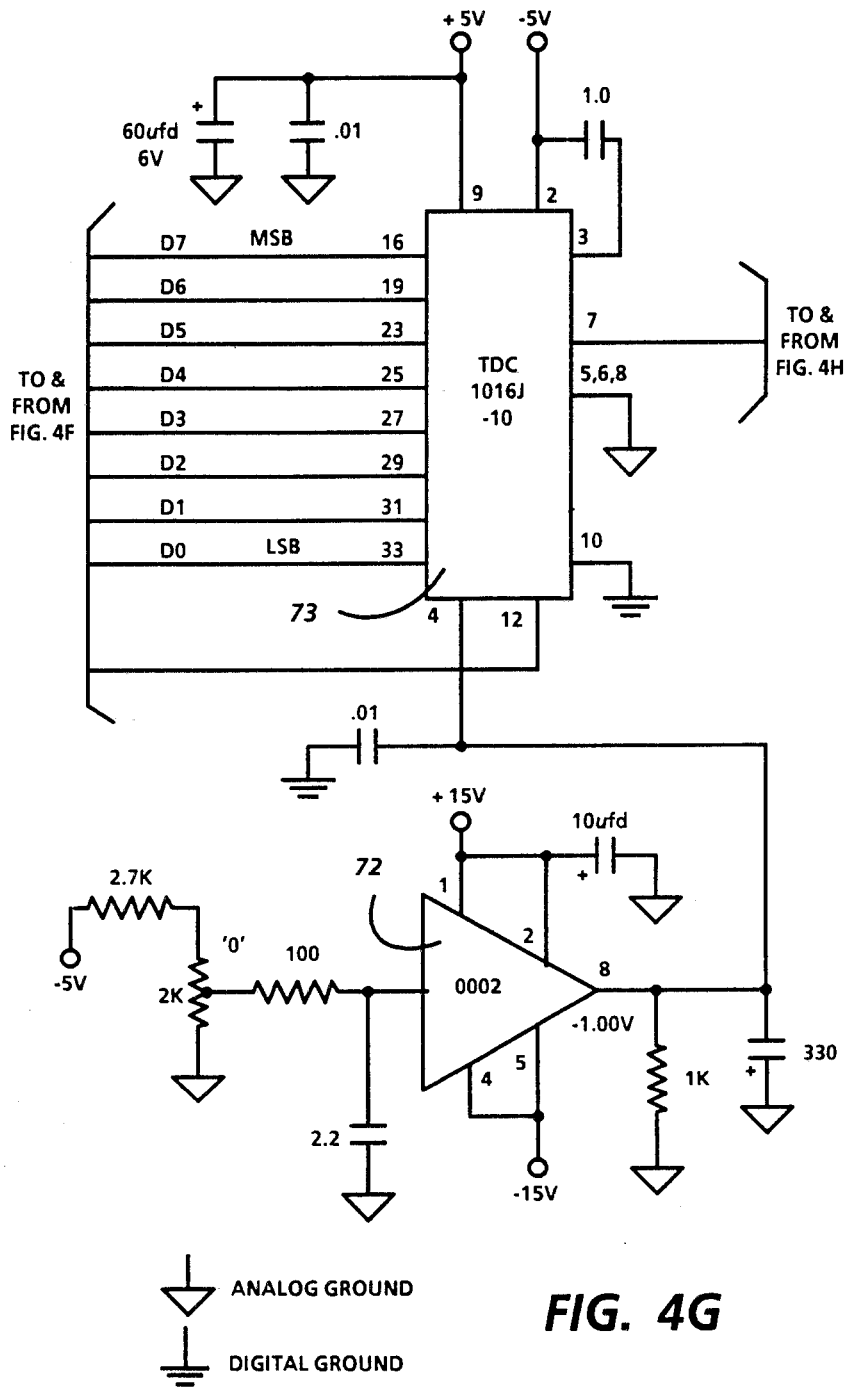
Figure 4H:
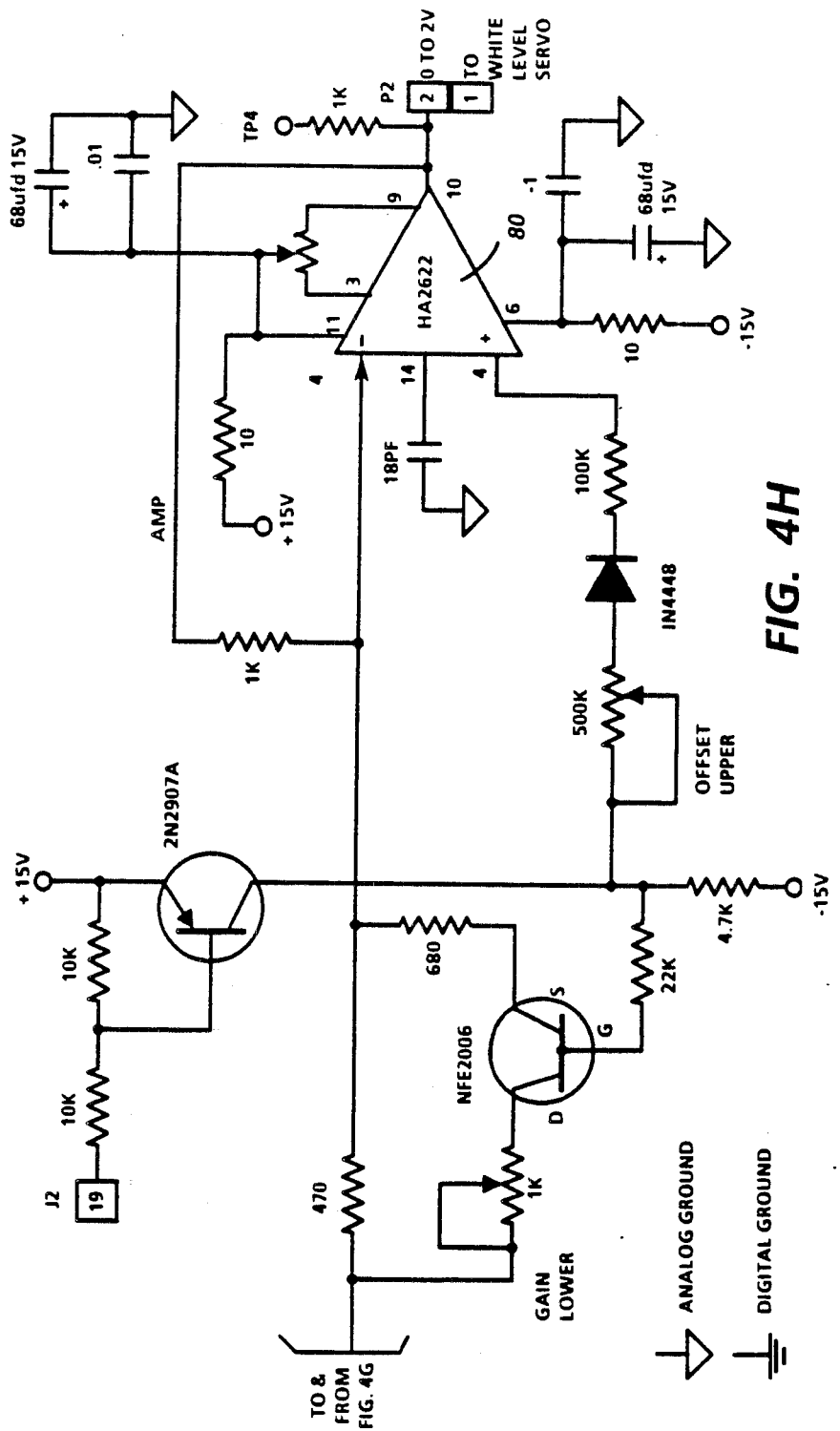
Figure 4J:
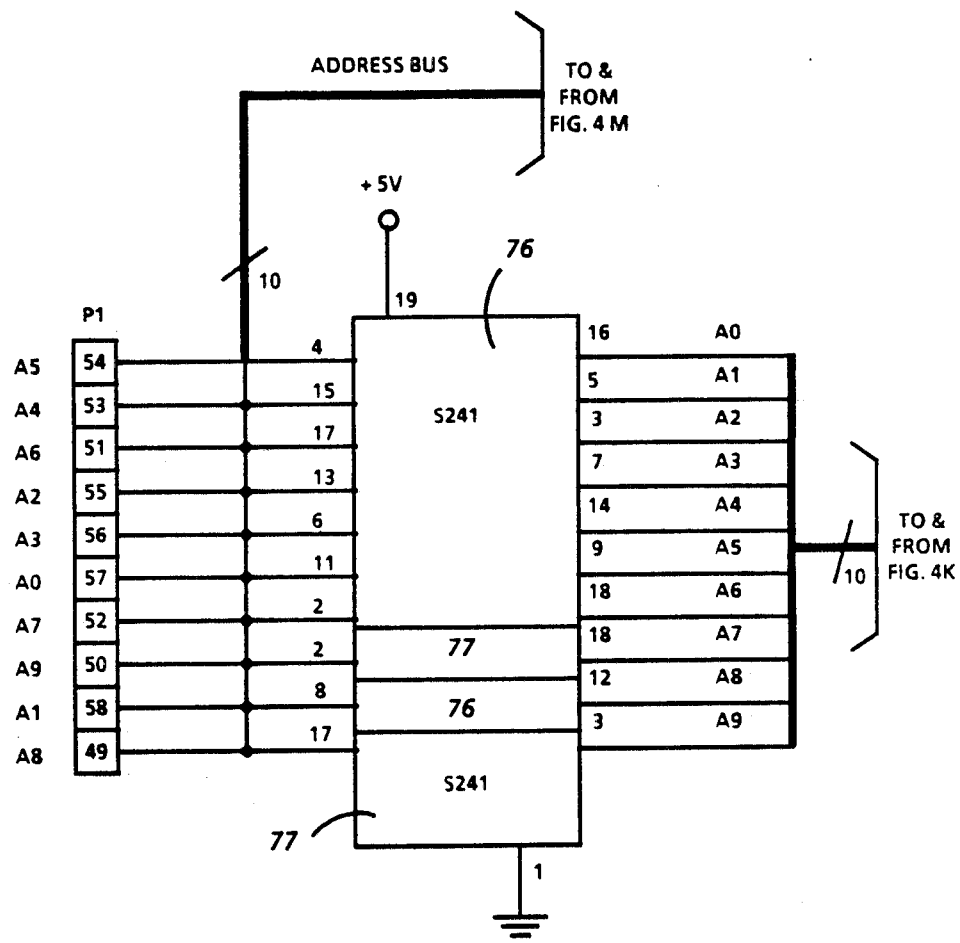
Figure 4K:
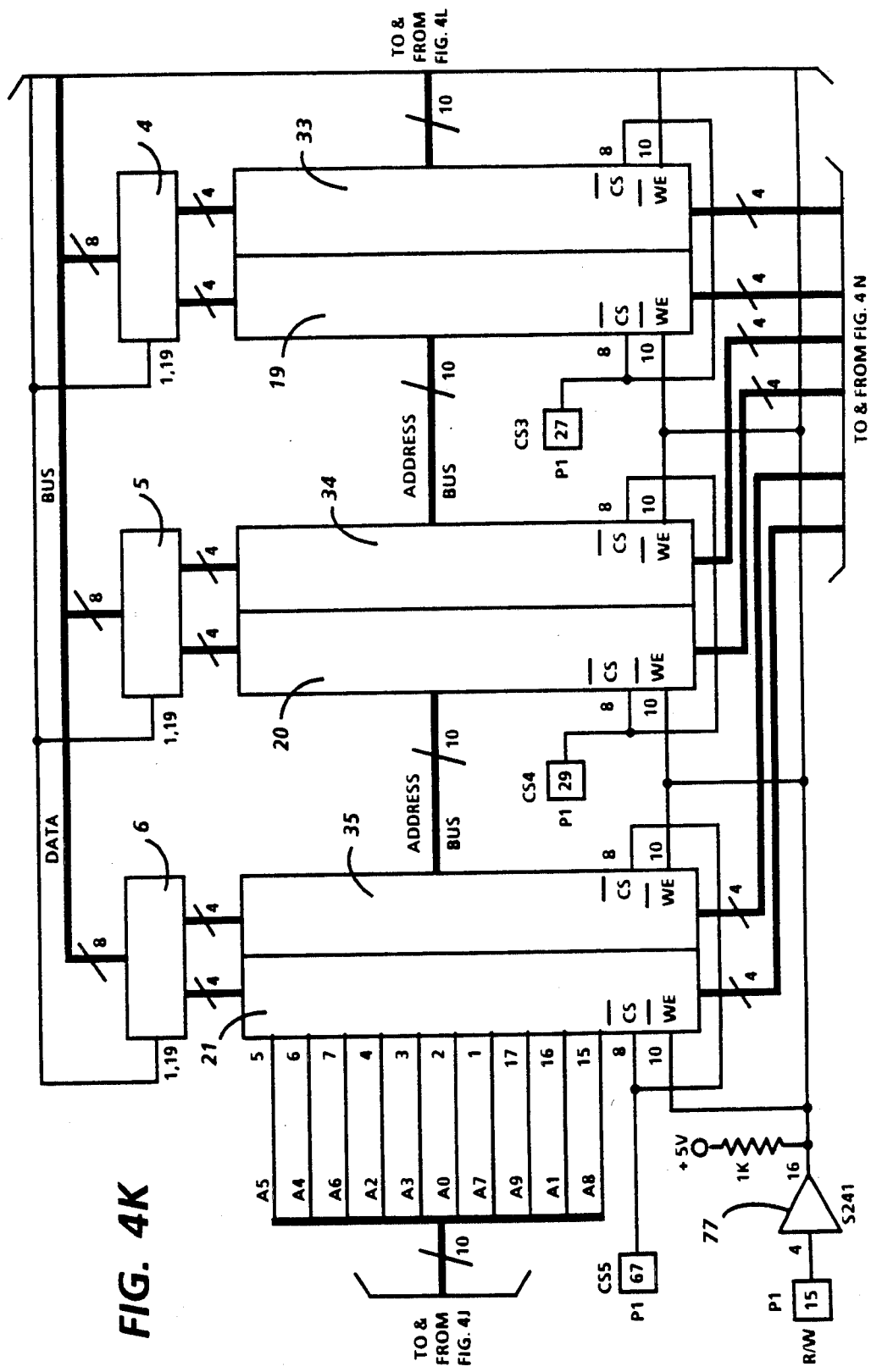
Figure 4L:
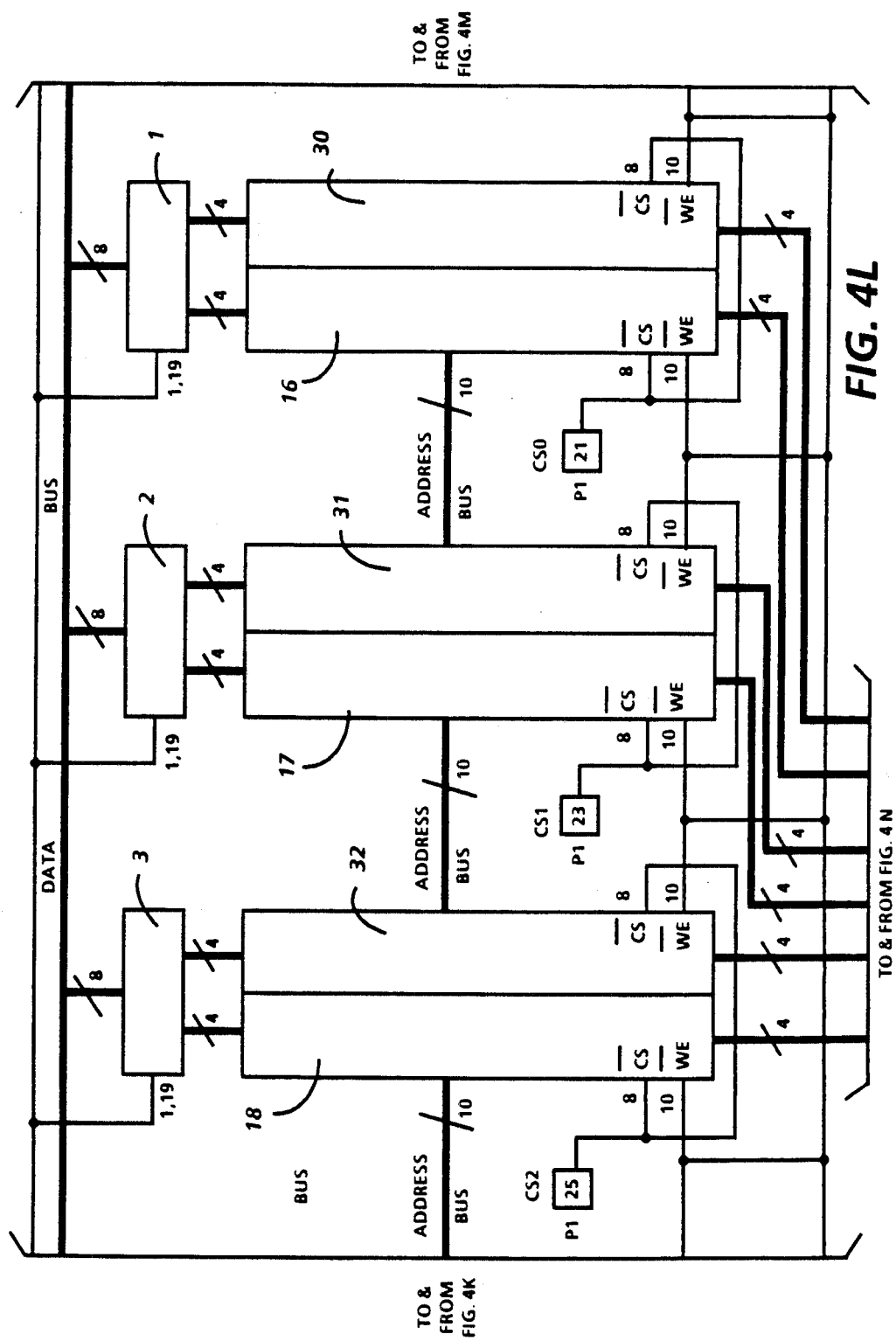
Figure 4M:
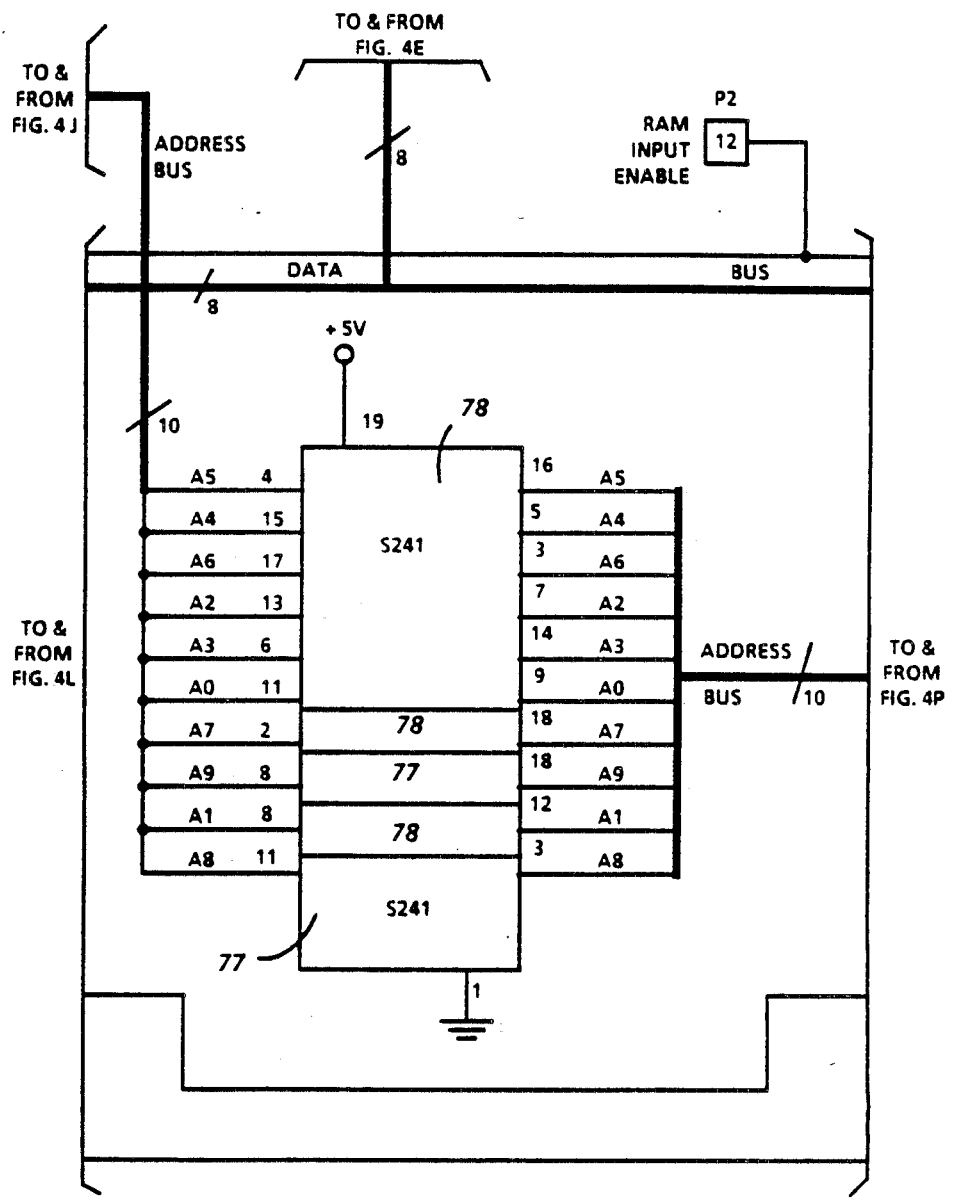
Figure 4N:
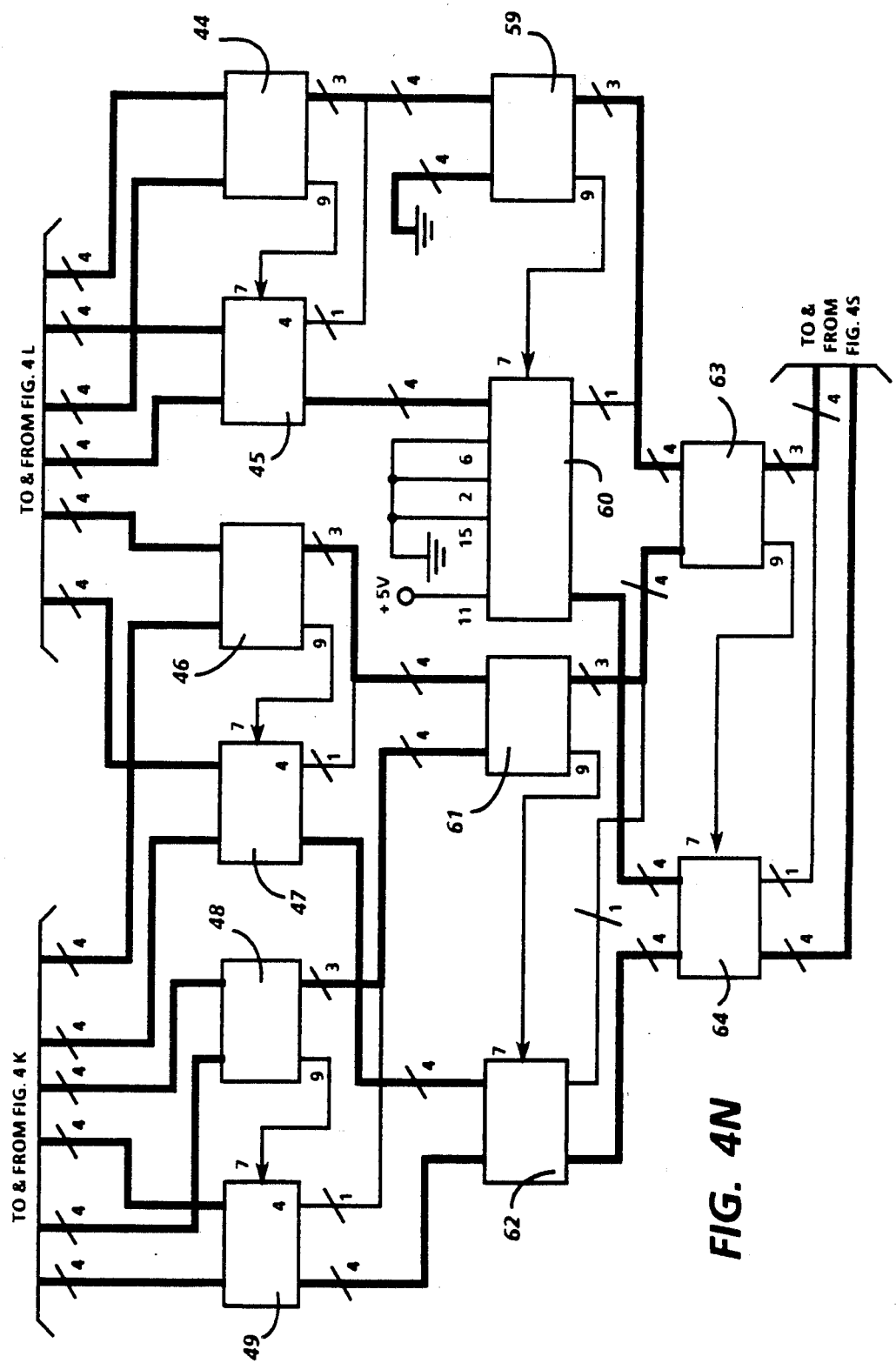
Figure 4P:
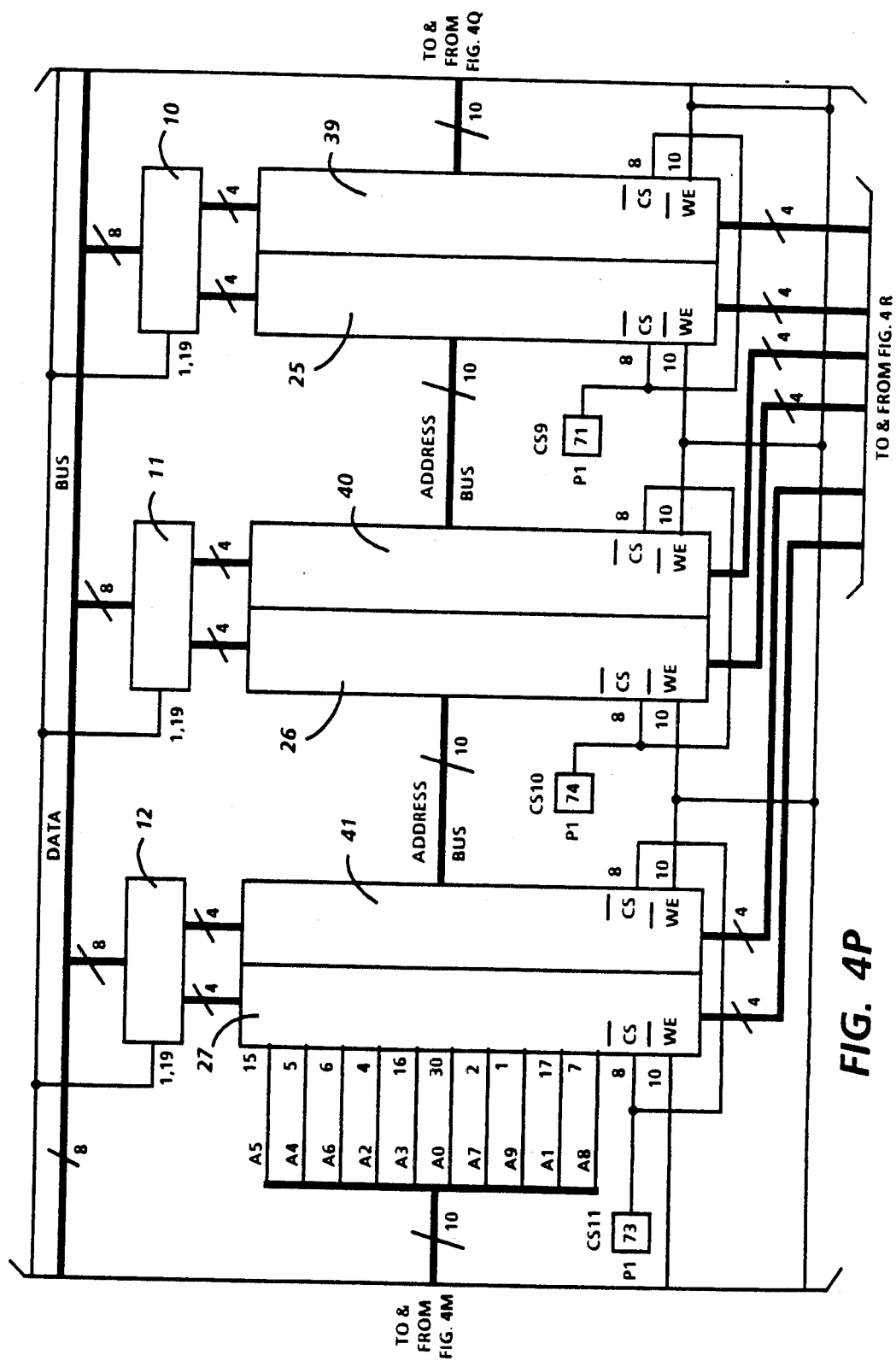
Figure 4Q:
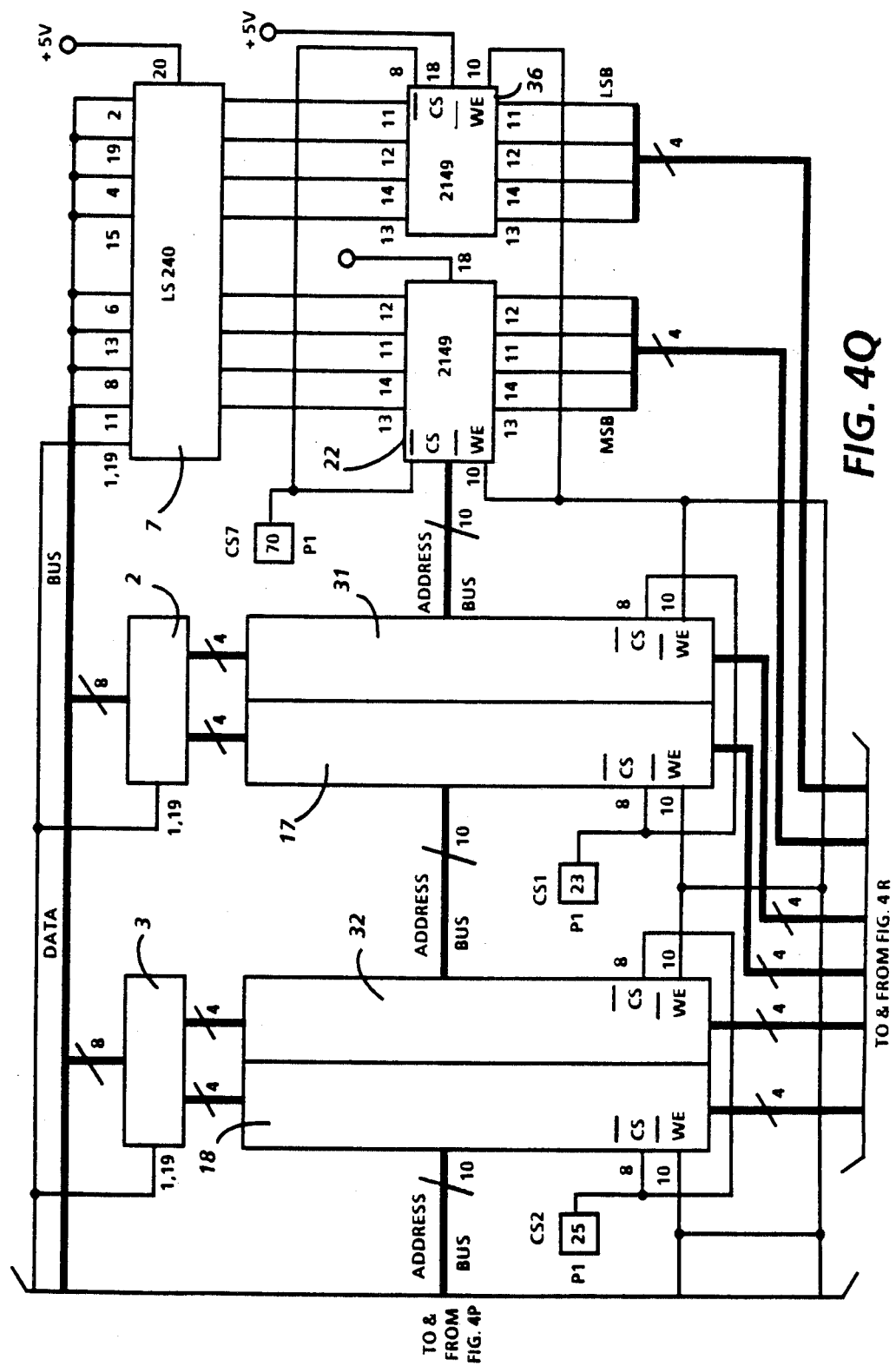
Figure 4R:
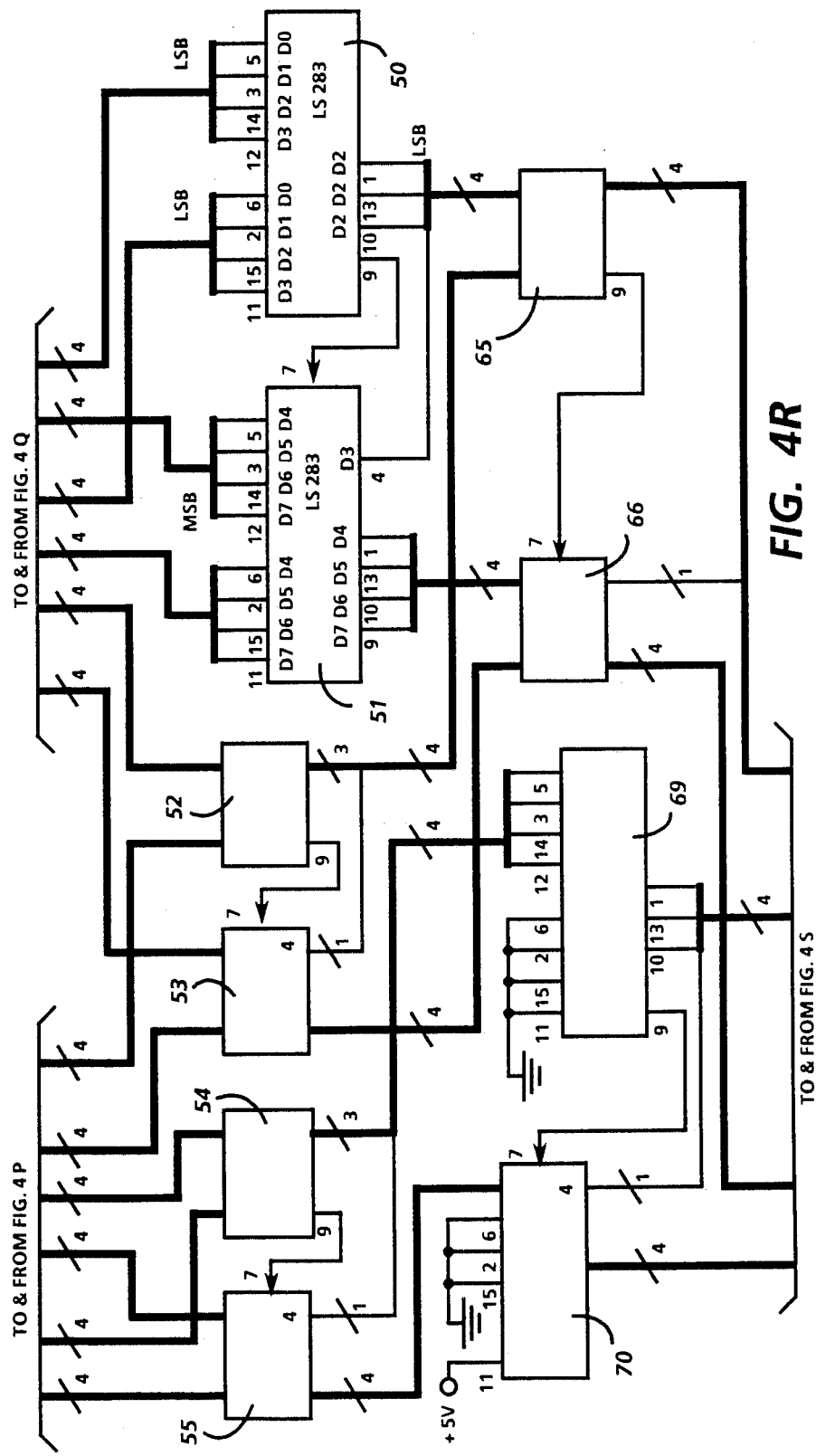
Figure 4S:
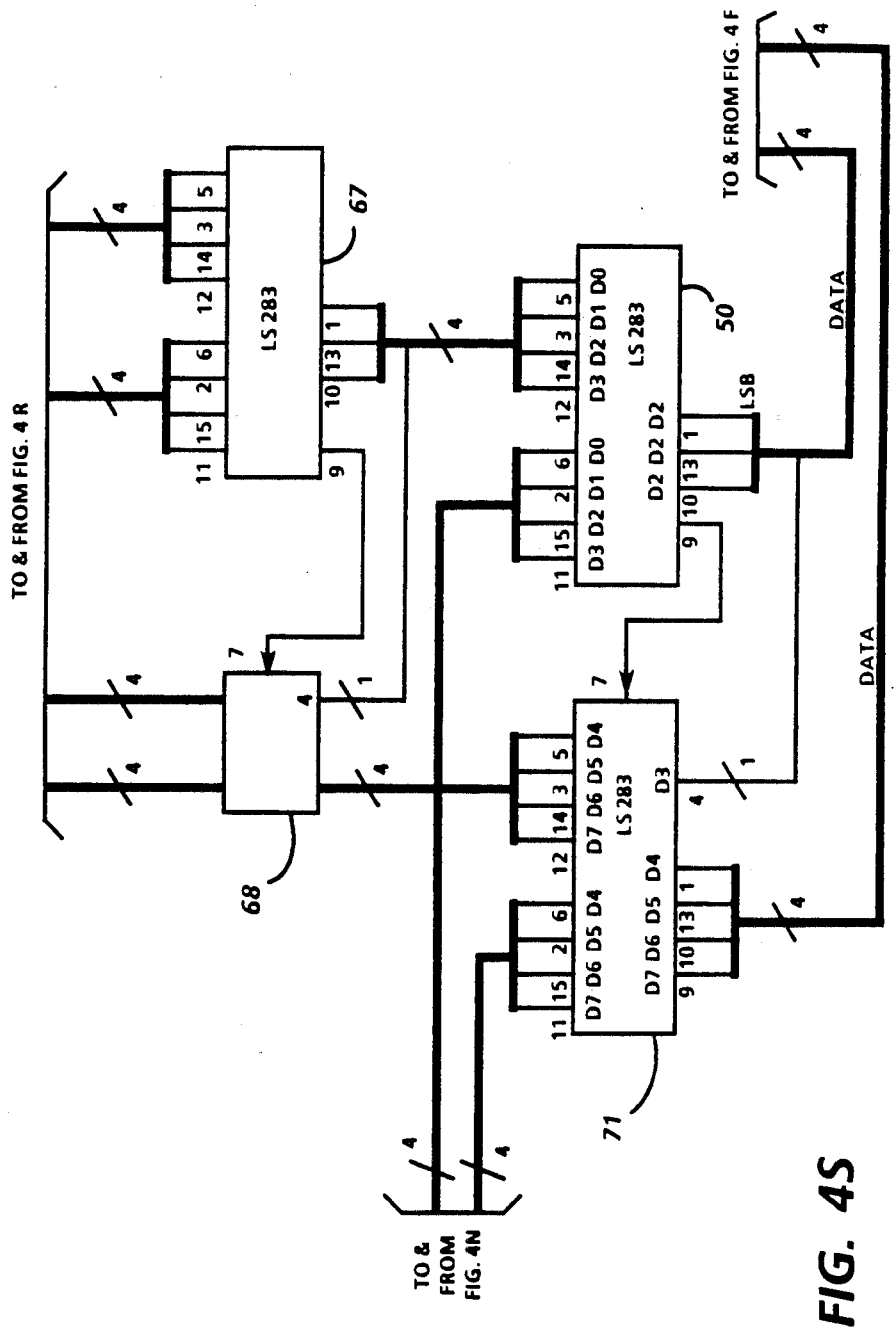

The memory 119 of FIG. 1 and memory 140 of FIG. 2 must have address inputs to identify the current scan line segment. There are a large number of different circuits that can be used to generate this address information. One simple alternative is shown in FIG. 3, although a circuit designer may decide on a different configuration to suit his application.

A voltage controlled oscillator 150 produces pulses. At the start-of-scan, counter 151 starts to count these pulses and will continue until the end-of-scan stops it. In this embodiment the scan line is divided into two thousand segments. If the total count in counter 151 is over two thousand, counter 153 is decremented, if the count is less than two thousand, the counter 153 is incremented. Finally, the counter 153 digital output is converted at D to A converter 155 to correct the VCO 150 frequency. The result is a count that counts from zero to two thousand every scan. This count can be used directly as the memory address.

The schematic drawing of the circuit is shown in FIG. 4. The output of the PMT is coupled in at the VIDEO INPUT, and is applied to two isolation stages 82, 75, which prevent the following gain stages from loading the PMT output. Two amplifiers 58, 29 provide enough gain so that the video signal can be compared to the reference signal generated at amplifier 43.

The reference and video signals are applied to the two input pins of the A and D converter 14 which produces an eight bit output on lines D-0 to D-7 which is a digital representation of the difference between the inputs. Thus it acts as the comparator 16 and converter 18 of FIG. 1.

During calibration, the output is applied to tri state device 13 which inverts the signals and applies them to twenty-four inverting memory devices 16-27, 30-41. The objective is to store an eight bit word for each of two thousand segments for twelve lines of calibration strip video, the final output correction value for each segment being the average value for twelve lines. During the calibrate phase, twelve lines of values are stored.

A circuit detail not shown on this schematic is that the data input line at the top of each memory device 16-27, 30-41 is the same line as the data output line at the bottom of each device. In other words, to reduce the number of pins per device, the same pin is used for data input and output. Therefore, to prevent the common input data line from shorting together all of the data output lines, isolation devices 1-12 are interposed between the memory devices 16–27, 30–41 and the common data line.

Address line drivers 76–78 supply address data to the memory devices. In the calibrate mode, the instantaneous output of the converter 14 is coupled through tri-state device 13, is stored in memory, but it is not used. The actual closed loop during calibration comprises tri-state device 28 which couples the eight bit signal to the D to A converter 73 and amplifier 80 out to the PMT dynode. The circuit speed is high enough so that all values will settle during each scan segment. At the end of each segment, the final digital value is stored in memory.

During use, tri-state devices 28 and 13 are turned off and tri-state device 57 is turned on, so that the circuit output must come from previously stored data in the memory. Each set of memory devices (21 and 35, 20 and 34, etc.) contains two thousand values for one of twelve lines. Therefore, the commonly addressed devices are all outputting a value for the same segment, which are averaged to determine the final correction value. This averaging is done by adders 44–70 which are connected to iteratively add two numbers and shift one bit to the right to divide by two. This average is then coupled out through tri-state device 57.

Tri-state device 42 is used to supply a nominal value to the D to A converter 73 for use between scans when all remaining tri-state devices are turned off. It had been found that the PMT will respond more quickly to its correction voltage at the beginning of a scan if the voltage at the controlled dynode is originally at a value within its normal range.

The output of amplifier 80 varies between plus one volt and minus one volt, while a PMT dynode voltage of between negative 150 and negative 275 volts is required. An amplifier of any common design can be used for this purpose. FIG. 5 is one example. The correction voltage is amplified in an operational amplifier function, consisting of an amplifier 100 configured as a voltage amplifier or followed by an emitter follower 101, which lowers the output impedance. The result is applied to the ninth dynode of the PMT.

While the invention has been described with reference to specific embodiments, it will be understood by those skilled in the art that various changes will be made and equivalents may be substituted for elements thereof without departing from the true spirit and scope of the invention. In addition, many modifications may be made without departing from the essential teachings of the invention.

What is claimed is:

1. A raster input scanner comprising:
   means for generating a beam of light of a variable amount, said amount of light in said beam being controlled by a difference signal,
   a rotating polygon for producing from said beam a flying spot of light to produce scan lines, each of which is divided into a number of segments,
   means to be scanned by said scan lines to reflect an amount of light comprising a calibration strip of known reflectivity to be scanned during calibration and an image area to be scanned during use,
   a light detector for converting said reflected light reflected from said means to be scanned into an electrical output,
   a reference voltage generator,
   a comparator responsive to said reference voltage generator and said light detector for calculating a difference signal between said detector output and said reference voltage for every segment of each scan during calibration,
   memory means for storing each difference signal for each segment of one scan, and for outputting said stored difference signal to said means for generating for corresponding segments of subsequent scans, and
   switching means for preventing said difference signal for each succeeding scan from being coupled to said memory means during use so that said difference signals generated by said comparator and stored by said memory means during calibration will continue to be used during use.

2. A raster input scanner of the type having means for generating a beam of light, a rotating polygon for producing from said beam a flying spot of light to produce scan lines, each of which is divided into a number of segments and means to be scanned by said scan lines to reflect an amount of light comprising a calibration strip of known reflectivity to be scanned during calibration and an image area to be scanned during use, the improvement comprising:
   a light detector having a variable gain controlled by a difference signal for converting said amount of light reflected from said means to be scanned into an electrical output,
   a reference voltage generator,
   a comparator responsive to said reference voltage generator and said light detector for calculating a difference signal between said detector output and said reference voltage for every segment of each scan during calibration,
   memory means for storing each difference signal for each segment of one scan, and for outputting said difference signal to said light detector to vary said gain for each corresponding segment for subsequent scans, and
   switching means for preventing said difference for each succeeding scan from being supplied to said memory means from said comparator during use so that said difference signals stored during calibration will continue to be used during use.

3. The scanner of claim 2 wherein said detector is a PMT comprising a dynode for varying said gain as a function of said difference signal and wherein said difference signal from said memory means is applied to said dynode to vary said gain.

4. The scanner of claim 3 wherein said difference signal received by said memory means from said comparator is an analog signal, and wherein said memory means comprises an analog to digital converter for converting said analog difference signal received frrom said comparator into a digital signal, a digital memory for storing said digital signal from said analog to digital converter, and a digital to analog converter for converting said digital signal output from said memory into an analog difference signal to be coupled to said detector.

5. The scanner of claim 4 wherein said digital memory stores said digital signals from said analog to digital converter for all of said segments for a plurality of scan lines during calibration, averages said stored digital signals for each segment for said plurality of scan lines to produce an average digital value for each segment, and outputs said average difference signal values to said detector.

6. A raster output scanner comprising:

means for generating a beam of light containing a variable amount of light, said amount being controlled by a difference signal, a rotating polygon for producing from said beam a flying spot of light to produce scan lines, each of which is divided into a number of segments, means to be scanned by said scan lines to reflect an amount of light comprising a calibration strip of known reflectivity to be scanned during calibration and an image area to be scanned during use, a light detector for converting said amount of reflected light reflected from said means to be scanned into an electrical output, a reference voltage generator, a comparator responsive to said reference voltage and said detector for calculating a difference signal between said detector output and said reference voltage for every segment of each scan during calibration, memory means for storing each difference signal output by said comparator for each segment of one scan, and for outputting said difference signals stored by said memory means to said means for generating for corresponding segments of subsequent scans, and switching means for preventing said difference signal for each succeeding scan from being coupled to said memory means from said comparator during use so that said difference signals stored in said memory means during calibration will continue to be used during use.

7. The scanner of claim 6 wherein said difference signal calculated by said comparator is an analog signal, and wherein said memory means comprises an analog to digital converter for converting said analog difference signal received from said comparator into a digital signal, a digital memory for storing said digital signal from said analog to digital converter, and a digital to analog converter for converting said digital signal stored in said memory means into an analog difference signal to be coupled to said means for generating.

8. The scanner of claim 7 wherein said memory means stores said digital output from said analog to digital converter for a plurality of scan lines during calibration, averages said digital output to produce an average digital output for each segment for said plurality of scan lines, and outputs said averages.

* * * * *